(12) United States Patent
Fill et al.

(10) Patent No.: US 7,727,295 B2
(45) Date of Patent: Jun. 1, 2010

(54) DECENTRALIZED OIL MIST COLLECTION SYSTEM

(75) Inventors: Ivo Fill, Grand Blanc, MI (US); Bryn Hartshorne, Novi, MI (US)

(73) Assignee: Filtra Systems Company, Farmington Hills, MI (US)

( * ) Notice: Subject to any disclaimer, the term of this patent is extended or adjusted under 35 U.S.C. 154(b) by 396 days.

(21) Appl. No.: 11/978,161

(22) Filed: Oct. 26, 2007

(65) Prior Publication Data
US 2008/0105129 A1    May 8, 2008

Related U.S. Application Data

(60) Provisional application No. 60/855,292, filed on Oct. 27, 2006.

(51) Int. Cl.
*B01D 50/00* (2006.01)
*F16K 15/14* (2006.01)
(52) U.S. Cl. .......................................... 55/340; 137/846
(58) Field of Classification Search .................. 55/340; 137/846
See application file for complete search history.

(56) References Cited

U.S. PATENT DOCUMENTS

| | | | |
|---|---|---|---|
| 1,836,004 A | 12/1931 | Becker | |
| 3,304,697 A | 2/1967 | Ramsey | |
| 3,386,230 A | 6/1968 | Riesberg et al | |
| 3,473,779 A * | 10/1969 | Gustafson et al. | 251/9 |
| 3,822,532 A * | 7/1974 | Weisgerber | 55/324 |
| 3,890,123 A | 6/1975 | Kuga | |
| 4,187,089 A | 2/1980 | Hodgson | |
| 4,234,328 A | 11/1980 | Hudson, Jr. | |

(Continued)

OTHER PUBLICATIONS

Monroe spiral Tube Oil Mist Collector; Monroe Environmental; 2000.

(Continued)

*Primary Examiner*—Walter D Griffin
*Assistant Examiner*—Amber Orlando
(74) *Attorney, Agent, or Firm*—John R. Benefiel

(57) ABSTRACT

An oil mist collection system for a plurality of machine tools each having a coolant system directing coolant at the cutting tools and collecting coolant and returning the same to a filtration system includes an oil mist collector at each station collecting oil from mist present at each station and draining the oil back to the associated machine tool coolant return, and return air ducts from each of the oil mist collectors extending to a central air filtration apparatus. Each oil mist collector preferably includes a vertical spiral coil wall defining a spiral flow path into which the mist is directed, the oil droplets collecting onto the spiral coil wall and draining into a collection chamber below the spiral coil wall for return to the associated machine tool via a drain line. Each mist collector is comprised of an inlet housing, a spiral coil housing and a collection housing forming a unitary housing assembly. A drain valve prevents drawing air back through the drain line by only opening periodically just sufficiently to partially discharge accumulated oil and any solid debris with only minimal return air entering through the drain. A cyclonic air flow is induced in the collection chamber to prevent setting and accumulation of solids and drains out through a tangentially facing drain fitting in the bottom outer region of the collection chamber.

16 Claims, 7 Drawing Sheets

U.S. PATENT DOCUMENTS

| | | | |
|---|---|---|---|
| 4,482,364 A | | 11/1984 | Martin et al. |
| 4,498,509 A | * | 2/1985 | Kojima et al. .................. 141/10 |
| 4,516,994 A | | 5/1985 | Kocher |
| 4,941,900 A | | 7/1990 | Cordes |
| 4,946,483 A | | 8/1990 | Coral |
| 5,113,671 A | | 5/1992 | Westermeyer |
| 5,218,832 A | | 6/1993 | Woolley |
| 5,277,704 A | | 1/1994 | Miller et al. |
| 5,318,152 A | * | 6/1994 | Ehlert ...................... 184/6.26 |
| 5,404,730 A | | 4/1995 | Westermeyer |
| 5,466,384 A | | 11/1995 | Prevost et al. |
| 5,479,907 A | * | 1/1996 | Walker, Jr. .................. 123/573 |
| 5,658,373 A | | 8/1997 | Diachuk |
| 5,698,014 A | | 12/1997 | Cadle et al. |
| 5,718,744 A | | 2/1998 | Ehlert |
| 6,309,436 B1 | | 10/2001 | Holch |
| 6,589,322 B2 | | 7/2003 | D'Eletto |
| 6,648,936 B2 | | 11/2003 | Higashino et al. |
| 6,709,476 B2 | | 3/2004 | Kitano et al. |

OTHER PUBLICATIONS

3Nine Separation Technolog; Innovative Technology for separation of Oil Mists Especially Suited for Machine Tools.
Aeroex International; Oil Mist Collector.
Cyclone Specifications; TMI Industrial Air Systems; 2002.

\* cited by examiner

DECENTRALIZED OIL MIST COLLECTION SYSTEM

CROSS REFERENCE TO RELATED APPLICATIONS

This application claims the benefit of U.S. provisional patent application Ser. No. 60/855,292, filed Oct. 27, 2006.

BACKGROUND OF THE INVENTION

Machine tools currently employ cutting fluid to cool and lubricate the cutting tools. This fluid is directed in jets at the cutting tools during machining, and the cutting fluid draining from the part and tools is collected and directed to filtration equipment for removal of contaminants and chips and then returned for reuse, in the well known manner. The coolant typically includes an oil-water mix and an oil mist is often generated by the fine oil particles becoming dispersed in the air. This oil mist must be collected in order to avoid polluting the air and also to prevent deposit of oil on the adjacent surfaces which would present a safety problem particularly if oil slicks on the floor are created. In manufacturing setups, a number of machine tools are arranged as in a transfer line where workpieces are successively moved along a series of stations where respective machine tools are located, and wherein various machining processes are carried out.

Heretofore, oil mist collection has taken two different approaches. In the first approach, the air around each of the machine tools is drawn into ducting and directed to a central demister where the mist is caused to be removed from the air and the air is then filtered before being discharged back into the ambient air.

This approach has several disadvantages. Firstly, the longer the air has an oil mist present in it, the more oil passes into the air as a vapor which cannot be removed by simply filtering the air, leading to possibly unacceptable levels of air pollution and necessitating other equipment to remove the oil vapor.

Secondly, the oil collected by the demister must be disposed of, creating a maintenance burden. Fine machining particles may also collect in the ducting, also adding to the maintenance burden.

A second approach is to provide a mist collector and air filter equipment at each machine tool or station to avoid the need for directing the mist over some distance through ducting. This has the disadvantage of increased costs and complexity as electrically powered blowers are involved and wiring and controls must be provided at each machine tool.

Also, air filters must be replaced regularly, and if large numbers of filters are involved, this creates a substantial maintenance burden, which is highly undesirable in a manufacturing facility.

Another approach has been proposed in which mist collectors are provided at each station or machine to drain to the machine tool sump or coolant return with the air ducted to central air filter which would avoid some of the drawbacks of the other two approaches.

Mist collectors heretofore employed have typically been used in refrigeration and in association with internal combustion engines. In the machine tool application there is an added difficulty in that cutting chips and other particle debris from machining will often be present in or collected with the oil mist. The chips must be accommodated in any installation, and if collecting in the ductwork or tanks, they must be periodically removed. If reaching the demister, they must also be disposed of.

In any oil mist collector, the collected oil must be allowed to drain into a collection tank. A difficulty involved in this task is that air which is being drawn to the air filter must preferably not be drawn back over the collected oil in order to minimize the formation of oil vapor and/or the regeneration of an oil mist from the collected oil. If chips are simply allowed to drop into an opening to a collection tank, the air drawn from the demister to be filtered will draw in air from the collection tank through the drain opening which will impede oil and chip draining and mix the air with the collected oil.

Electrically controlled drain valves for a collection tank have been used to be open only when oil is covering the drain to prevent any air from being drawn in through the drain by action of the air filter blower. This adds complexity to the installation and imposes a maintenance burden.

Any solids will tend to settle out in the tank, requiring periodic maintenance to clean out the accumulated solids.

This is particularly so when the tank is only periodically opened to a drain as this would allow more time for the chips to settle out and not be drained such that a periodic cleaning is necessitated.

This same difficulty is found if an overflow weir were used to receive oil drained from a collection tank.

Another difficulty with the decentralized approach is the cost of individual mist collectors at each station particularly due to the ducting and transitions required.

It is an object of the present invention to provide an oil collection system for a plurality of machine installations which does not involve moving the mist through ducts over a substantial distance but does not require complete oil mist collectors and air filters at each station, and which does not require disposal of oil or chips collected by the oil collector or clean out from a collecting tank.

It is another object of the invention to provide an individual oil mist collector which allows drainage of oil without return air flowing over the collected oil as to recreate a mist or pollution of the air with oil vapor while preventing settling out of chips.

SUMMARY OF THE INVENTION

The above recited objects as well as other objects which will be understood upon a reading of the specification and claims are achieved by a decentralized system with mist collectors at each station.

The above objects and other objects which will be understood upon a reading of the following specification and claims are achieved by an oil mist collecting system which includes an individual oil mist collector at each station and directing the demisted air to a central air filtration unit such that transporting mist laden air over substantial distances is avoided.

The oil mist collectors are of a spiral coil design with the turns oriented vertically so that condensed oil drains down (along with any chips or fines) into an associated individual mist collection tank which in turn drains into a machine tool sump (or return chute or trench) to be handled by the system cutting fluid filtration apparatus, eliminating the need for disposal of the collected oil.

The coils are held in a housing assembly which can be installed in line with a mist inlet, air collection ducting and drainage connections with a simple incline connection to mist inlet ducts and air outlet ducts as well as a drain.

Drainage of the condensed oil is collected in an individual tank located immediately below the drain and drainage is controlled by controllable opened drain valves of a special design which prevent entry of back air flow from being drawn in over the collected oil. These valves preferably accommodate any chips or other debris. In a preferred form, a flattened tube is connected to the drain, and the vacuum pressure developed by the air blowed acts to collapse the tube and prevent entry of air. As the oil and chips accumulate, their weight opens the tube to just sufficient allow a portion of the accumulated oil and chips to pass through. As soon as this happens, the vacuum again acts to flatten and close the tube to prevent any air from being drawn into the tube.

The location of the individual collection tanks immediately below the spiral coil exposes the condensed oil and chips to a cyclonic air flow which retards settling out of the chips and drives the oil and chips out to the outer wall where a drain opening is located to receive the collected oil and chips and pass the same to the drain valve.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention involves placing a plurality of mist collectors each at the a machine tool installation combined with a central air filter into which air from each mist collector is drawn so that the mist is removed prior to entering the ducting to the central air filter.

Figure 1:
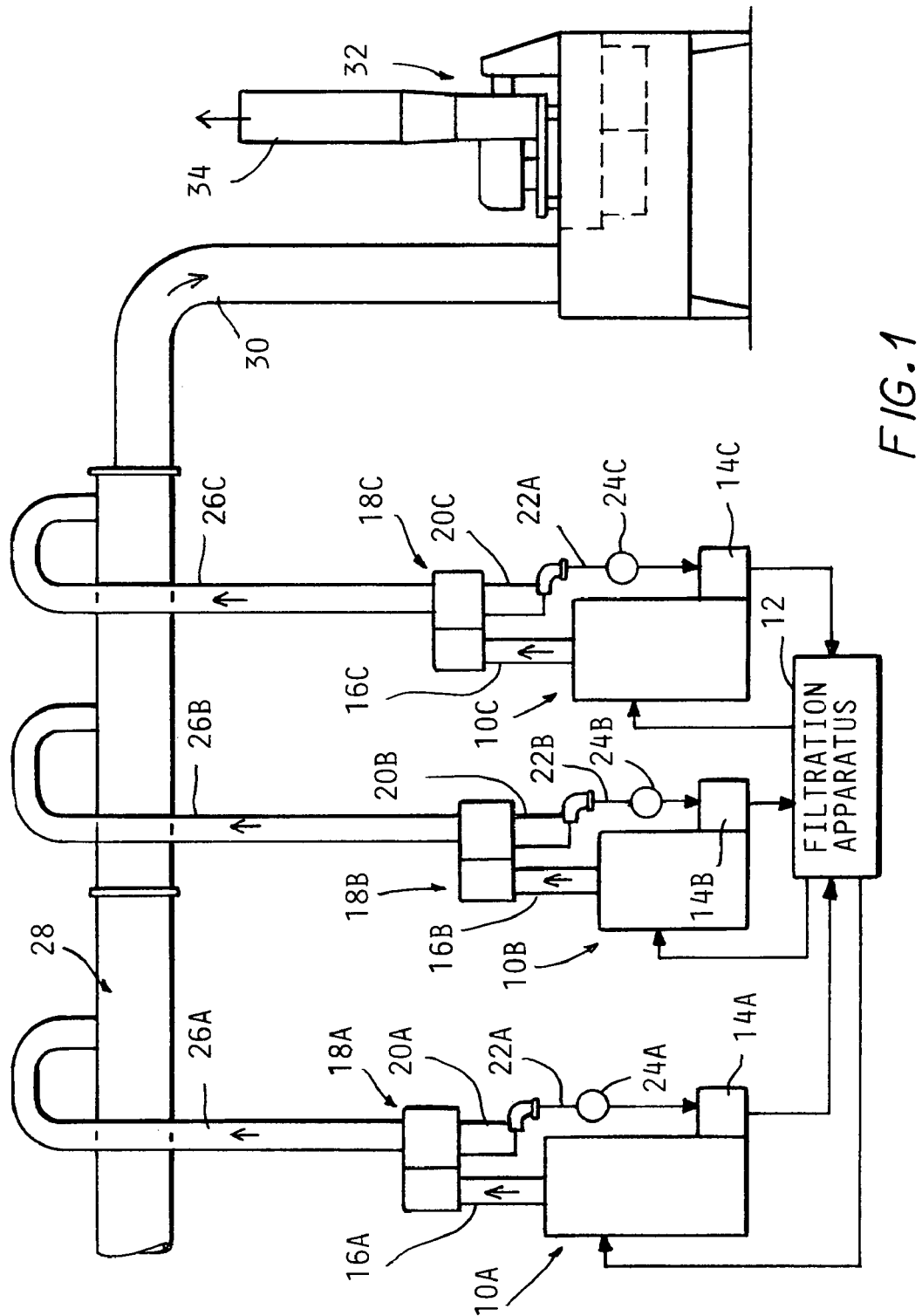
FIG. 1 is a diagrammatic representation of an oil mist collection system according to the present invention associated with a plurality of machine tools.

Referring to the drawings and particularly FIG. 1, a series of machine tool stations 10A, 10B, 10C are depicted. Each machine tool station 10A, 10B, 10C is supplied with clean cutting fluid from a filtration apparatus 12. The coolant is sprayed at the parts and cutting tools in the well known manner and drains down from the part and tools to be collected, along with the chips and other machining debris in a sump 14A where it can be pumped back to the filtration apparatus 12. Other arrangements may include a below grade trench or above grade trough to return the dirty coolant and debris to the filtration apparatus 12 as is well known in this field.

According to the present invention, the mist laden air in the vicinity of each machine tool station 10A, 10B, 10C, is collected in a short duct 16A, B, C and drawn into a respective individual oil mist collector assembly 18 described in detail below.

The condensed oil and machining chips and other debris is collected in integrated drain tanks 20A, 20B, 20C installed below each oil mist collector device 18A, B, C and thereafter directed via a drain line 22A, 22B, 22C and drain valve 24A, 24B, 24C back to the dirty coolant collection space such as sumps 14A, B, C as indicated in FIG. 1.

The demisted air is drawn up out of each oil mist collector device 18A, B, C via vertical stacks 26A, B, C and connected to the top of air plenum 28.

The air is drawn down the plenum 28 and through a duct 30 connected to a conventional centralized air cleaner apparatus 32.

The air filter apparatus may include replaceable HEPA filters which remove any residual oil, fine particles, etc. prior to being discharged back into the ambient atmosphere via a stack 34.

It can be appreciated that by removing the oil mist at each station, the air flow back to the central air filter 32 is much less likely to become polluted with oil vapor which cannot be removed with filters.

Furthermore, by discharging the condensed oil back into the coolant collector at each station the need for disposal of the collected oil is avoided.

Finally, as the oil mist collector devices 18A, B, C are passive and do not require controls, etc. and only a single centralized air cleaner apparatus is required, maintenance is held to a minimum and the system is much simplified over demister systems requiring blowers and controls, and air filters at each station.

FIGS. 2-8 show the details of an oil mist collector device 18 suited to this application. Three generally cylindrical sheet metal subhousings 36, 38, 40 integrated together to form a unitary single "in line" housing assembly 42. The first subhousing 36 defines a mist intake chamber 44 connected to a duct 16 collecting mist from a machine tool 10 by a flange 46 welded concentric to an opening 48 in a bottom wall 50. A removable access cover 52 is attached to a flange 54 welded around an opening 56 in a top plate 58.

Located side by side with the intake chamber 44 is a spiral coil chamber 60 defined by a vertically oriented spiral coil wall 62 beginning tangential to the partially cylindrical outer wall 64 defining the sides of the intake chamber 44. The spiral coil wall 62 winds inwardly around the center axis of an outlet hole 66 in the bottom wall 68 of the spiral coil chamber to which it is welded in chamber 60 (which is defined by a plate 68 common with the bottom wall 50 of subhousing 36) becoming of progressively smaller radius until it becomes tangent to the outlet hole 66 where it has a terminus 70.

Mist laden air is drawn into the progressively tighter radius spiral passageway 72 defined between turns of the spiral coil wall 62, flowing tangentially around the axis of the outlet hole 66 constrained by the bottom wall 68 until the passageway 72 reaches the outer perimeter of the outlet hole 66. The centrifugal forces of the mist developed by a decreasing radius circumferential flow cause the air droplets to be condensed on the inner sides of the spiral coil wall 62.

Since the spiral coil wall 62 is vertically oriented, the condensed oil (and any solid debris) flows down to the bottom wall 68 and out the hole 66.

An integrated drain collection chamber 74 is defined by the third subhousing 40 located aligned and immediately below the hole 64 in the bottom wall 68 of the coil chamber 60 by having a flange 78 attached to a flange 76 welded to the bottom wail 68. Being exposed to the cyclonic air flow in the spiral coil wall 62 induces a cyclonic air flow in the collection chamber 74 which assists in draining oil and solids collected in the collection chamber 74, as will be discussed below.

An air outlet tube 80 is mounted within the coil chamber 60 concentric to the bottom hole 64 and extending below the bottom wall 68 to protrude into the collection drain chamber 74. Radial supports 82 connected to the flange 76 hold the lower end of the air outlet tube 80 centered in the bottom wall opening 64. The upper end is welded to the top wall 84 of the coil chamber 60 (which may be formed by a top plate 85 common with the top wall 58 of the inlet chamber 44.

The air return duct 26 is connected to the air outlet tube 80 with a flange 81. The collection chamber 74 has a drain fitting 86 welded thereto which connects to drain pipe 22 allowing collected oil and particles to pass out of the chamber 74, and is directly returned to the sumps 14 (or troughs or trenches) so that a separate disposal of oil is not necessitated.

A single oil mist collector device can be sized to accommodate a single station and connected to the air return system with simple duct to duct connections not requiring any transitions, etc.

In order to keep the spiral coil wall 62 surfaces free from debris, as well as the bottom wall 68, a wash spray header 90 is connected to a pressurized source of clean coolant 92, as from the filtration apparatus to direct a spray of the spiral coil wall 62 to clean any debris from the wall and wash it out.

It is important to prevent air from being drawn back through the drain fitting and into the air outlet, as this will tend to recreate the mist as to cause oil vapor to be added to the air returned to the central air filtration equipment.

For this reason, a special controlled opening valve 24 is preferably included in each drain line 22 which prevents draining in any entry of air through the drain. FIGS. 9-12 show several embodiments of valves intended to accommodate the presence of chips while preventing air from passing back to the collection chamber 74.

Figure 9:
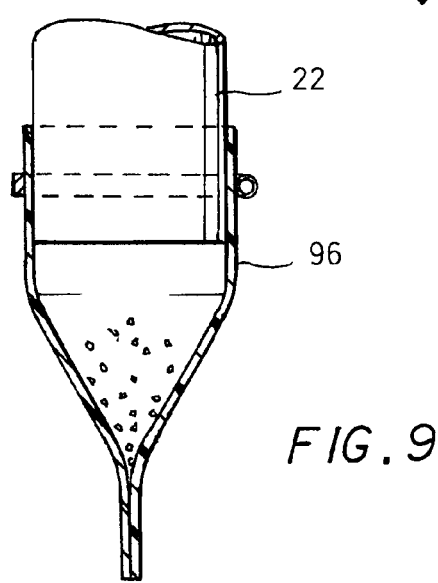
FIG. 9 is a partially sectional view of a drain valve which may be combined with the oil mist collector devices shown in FIG. 1.
Figure 15:
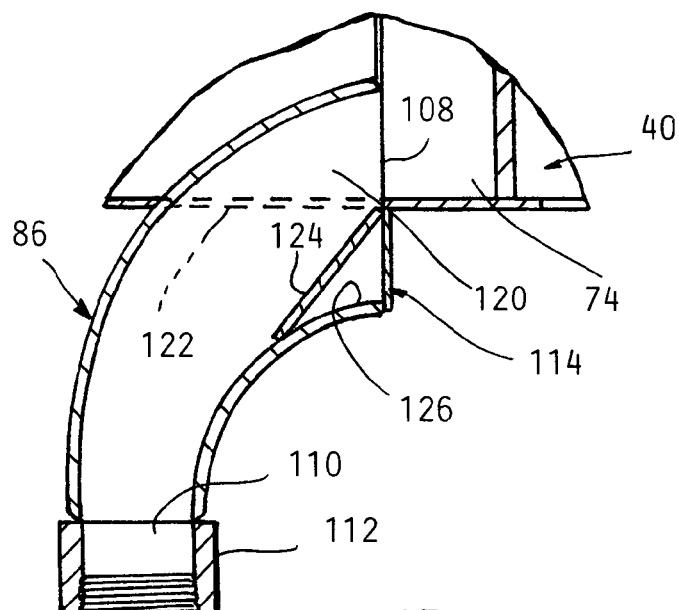
FIG. 15 is a view of the section taken along the line 15-15 in FIG. 3 through a drain fitting and integrated collector tank.
Figures 16, 17:
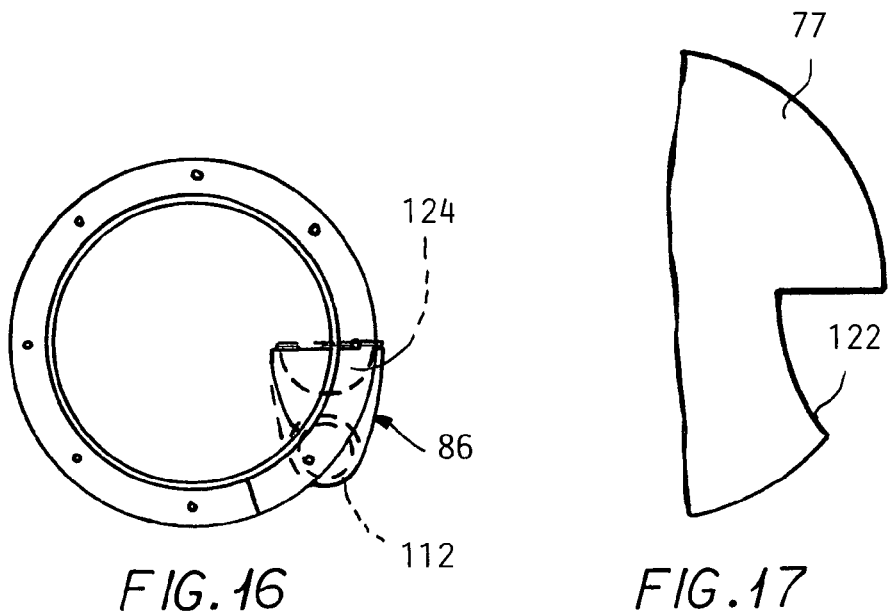
FIG. 16 is a top view of the integrated collector tank.
FIG. 17 is a plan view of integrated collection tank showing a cutout for the drain fitting.
Figure 18:
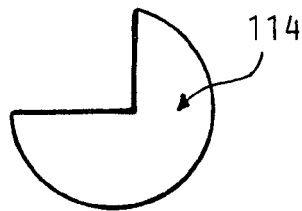
FIG. 18 is a plan view of a partial plug for the drain fitting.
Figure 19:
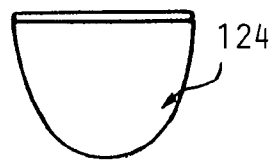
FIG. 19 is a plan view of a diverter insert welded to the drain fitting.

In FIG. 9, a length of flattened hose 96 is clamped to the drain line 22. The vacuum developed by the air filter blower holds the hose 96 flattened so that air cannot enter. As oil and chips accumulate, a weight eventually accumulates sufficient to force the hose to distend sufficiently to allow a portion of the accumulated oil and chips to pass out without opening to the air. The hose 96 is immediately reflattened by the vacuum after the weight of accumulated oil and debris is reduced to a point where the hose 96 can again be collapsed to again seal off the drain line 22.

Figure 10:
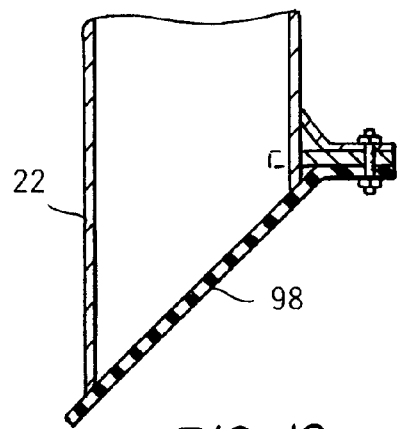
FIG. 10 is a second form of a drain valve preferably combined with the oil mist collector devices shown in FIG. 1.

In FIG. 10, a rubber flap 98 is installed on the angled end of the drain pipe 22. Its resilience and the vacuum keep it closed until a sufficient accumulation of oil and any chips develops to overcome the closing force and causes the flap 98 to open and the oil and chips slide out on the inclined flap, when the remaining weight is reduced to where the closing force reasserts itself immediately to close the valve and prevent the entrance of air.

Figure 12:
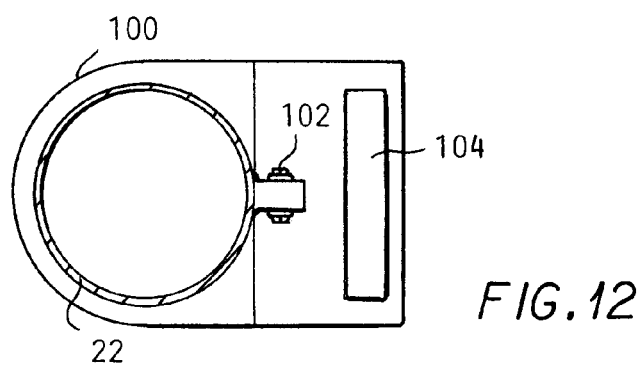
FIG. 12 is a top view of the drain valve shown in FIG. 11.
Figure 11:
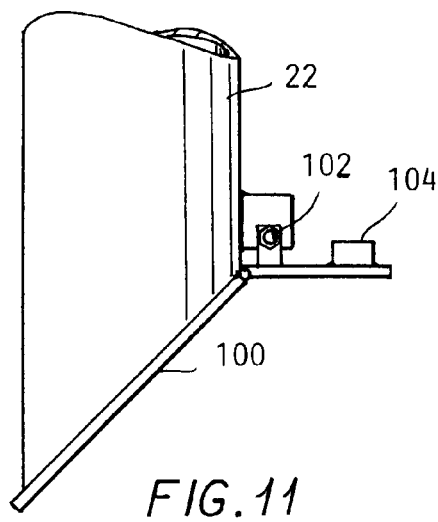
FIG. 11 is a side view of a third form of the drain valve which may be combined with the oil mist collector devices shown in FIG. 1.

FIGS. 11 and 12 show a counterweighted rigid valve flap 100 hinged normally held at 102 to one side of the angled end of the drain pipe 22 and normally held covering the same by the exertion of the weight of a counterweight 102 (and the vacuum force). When the weight of oil and chips reaches a predetermined level, the flap 100 opens and allows discharge of a portion of the oil and chips as described above.

Thus, a simplified oil mist system has been provided which minimizes costs, complexities and maintenance, and which is highly reliable in operation.

Figure 13:
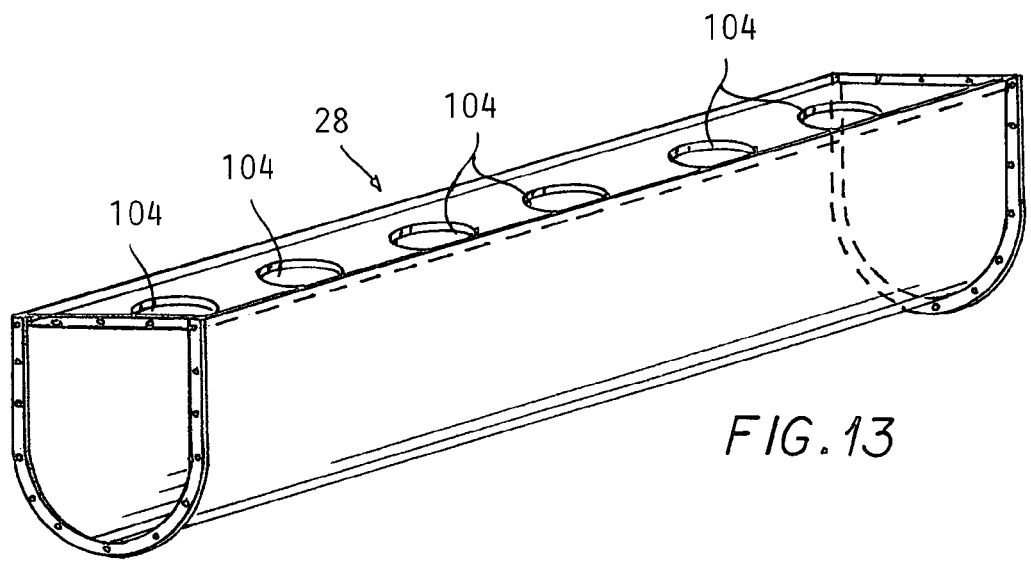
FIG. 13 is a pictorial view of a return air plenum preferably used in the oil mist collection system shown in FIG. 1.
Figure 14:
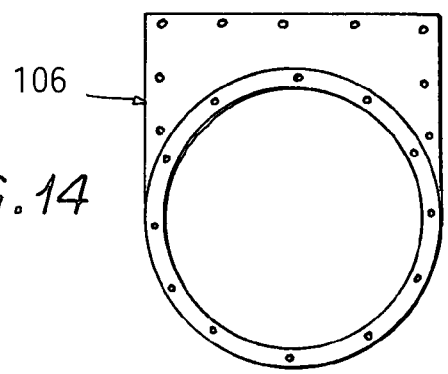
FIG. 14 is an end view of a transition piece used with the air plenum shown in FIG. 1.
Figure 2:
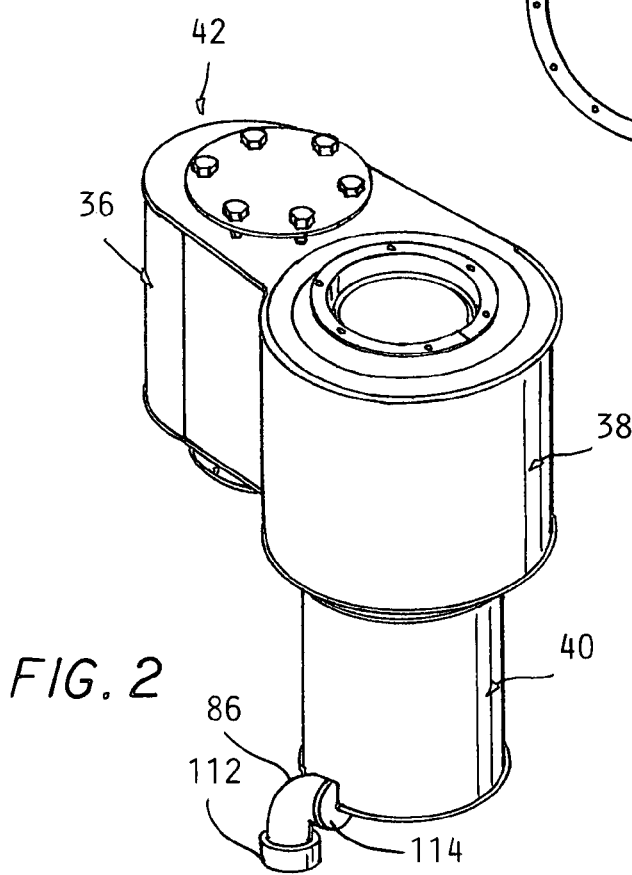
FIG. 2 is a pictorial view of one of the individual oil mist collector devices included in the system shown in FIG. 1.
Figure 7:
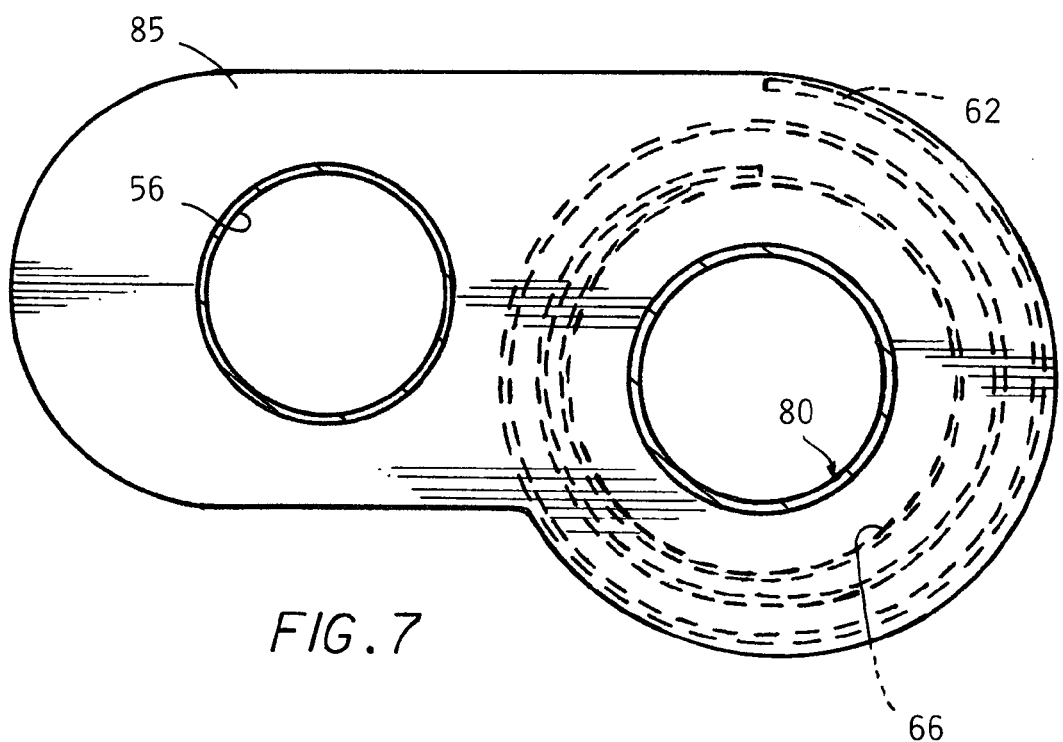
FIG. 7 is a view of the section 7-7 taken in FIG. 4.
Figures 3, 3A:
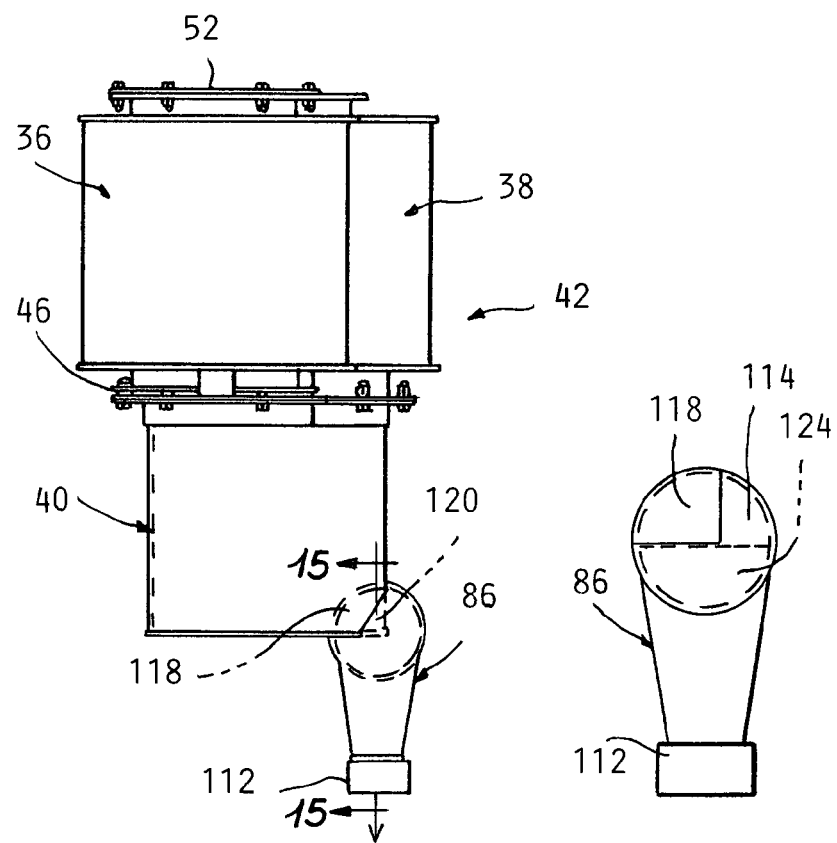
FIG. 3 is a side view of the oil mist collector device shown in FIG. 2.
Figure 5:
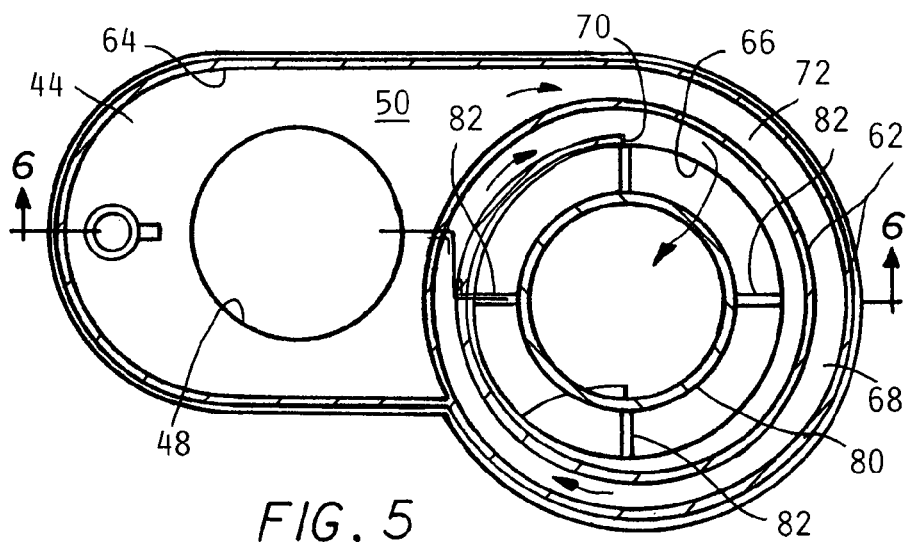
FIG. 5 is a view of the section 5-5 taken in FIG. 4.
Figure 4:
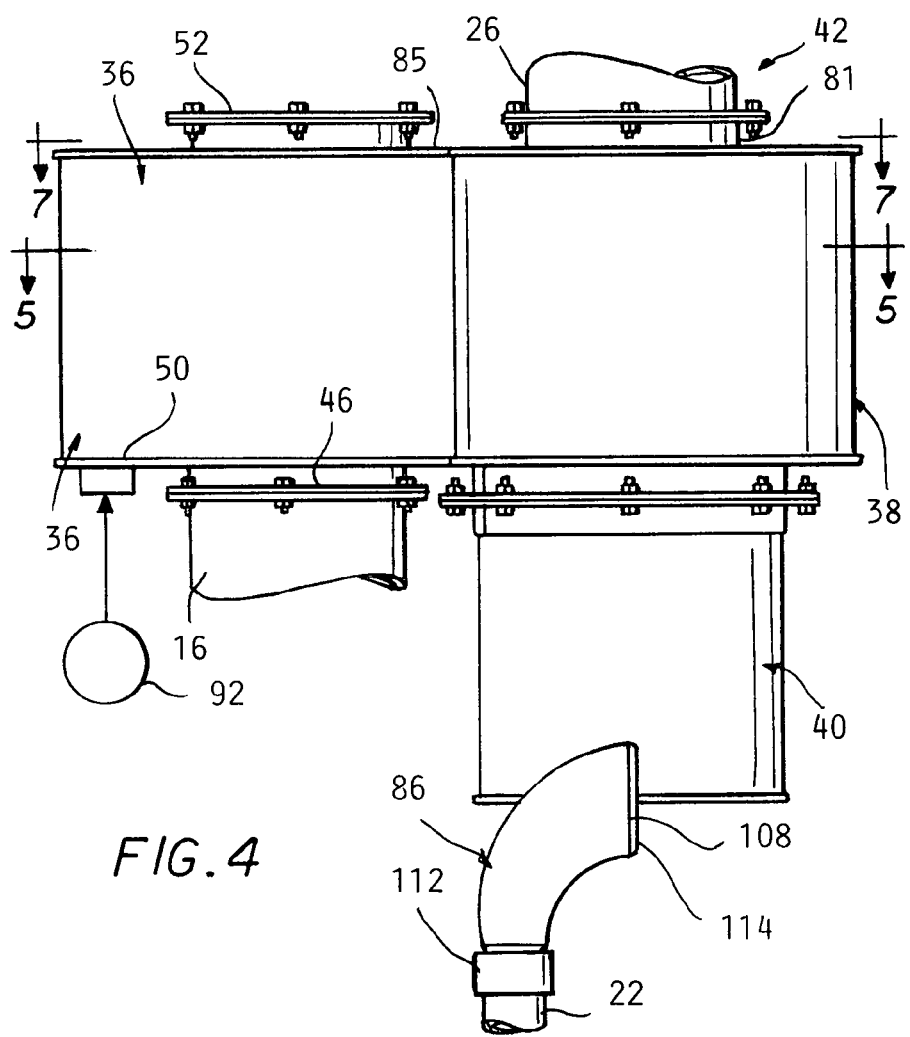
FIG. 4 is a front view of the oil mist collector device shown in FIGS. 2 and 3.

FIGS. 13 and 14 show details of the preferred form of air return ducting, which features a U shaped channel for the horizontal run. Openings 104 in a top wall allow connection of air ducts 26. A transition piece 106 allows connection of round ducts 30 to be connected to the central air filter apparatus 32. The U shape provides the advantages of a round duct in eliminating corners to avoid collection of dirt and oil while enabling a flat surface for connection to the branch ducts 26.

An important aspect of the present invention is to maintain a drainage of the condensed oil and prevent any solids from settling out and causing an accumulation of solids in the system.

Figure 6:
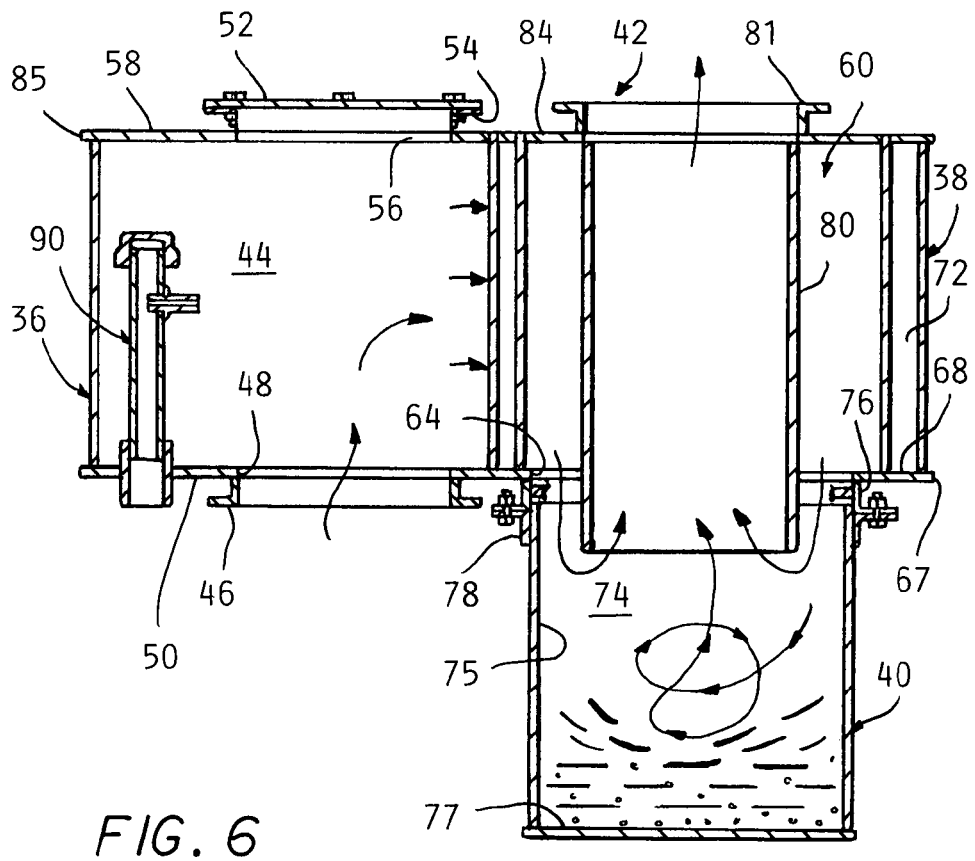
FIG. 6 is a view of the section 6-6 taken in FIG. 5.
Figure 8:
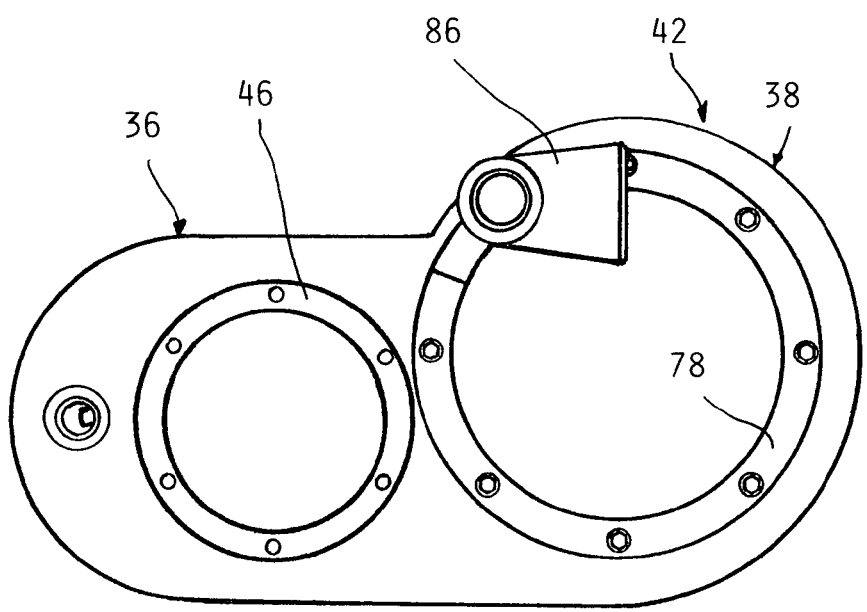
FIG. 8 is a bottom view of the oil mist collector device shown in FIGS. 2 and 3.

As represented in FIG. 6, a cyclonic air flow pattern is established in the drain collection chamber 74 by being open to the bottom of the spiral coil 62. This causes the collected oil and solids to be forced to the outer region of the chamber 74. To take advantage of this, the drain fitting 86 is longitudinally oriented and has an opening communicating with the outer region of the drain collection chamber 74. The drain fitting 86 may be a reducing elbow with a larger (i.e. four inches) end 108 and a smaller diameter end 110 with a coupling 12 threaded thereon welded to be airtight. The larger end 108 is approximately three quarters covered with a cover piece 114 (FIG. 3) leaving an opening 109 in the end 108.

The open quarter 118 of the end 108 opens into the chamber 74. An opening 126 in the sidewall 75 and an opening 122 in the bottom wall 77 both allow the outside of the drain fitting 86 to be recessed into the bottom outside perimeter of the subhousing 40 to which it is welded to be air tight. Thus, the open quarter 109 projects into the interior of the chamber tangentially aligned with the opening 120 in the side wall 75. The oil and debris is being directed tangentially along the wall by the cyclonic air flow such that this open quarter acts as a scoop collector of the oil and solids which passes down through the bottom all opening 122 into the interior of the fitting 86.

A ramp piece 124 is welded into the end 108 to eliminate the crevice 126 formed by cover 114. This arrangement of the chamber 74 exposed to cyclonic air flow and a tangentially directed drain avoids settling out and accumulation therein of solids.

The invention claimed is:

1. An oil mist collection system for collecting air containing oil droplet adjacent a plurality of machining stations where oil containing coolant is directed at cutting tools and parts and collected by a coolant return and returned to a filtration apparatus comprising:

an oil mist collector at each machine tool station receiving mist and condensing out the oil droplets dispersed therein;

a drain opening allowing collected oil to pass into a collection chamber immediately below said oil mist collector;

a drain connection from each collection chamber returning collected oil to a respective machine tool coolant return for return to said filtration system coolant return including a normally closed valve partially opened to allow draining of collected oil while preventing drawing air into said drain through said valve; and, return ducting directing air from each mist collector after collection of oil therefrom to a central air filter apparatus drawing air through said air return ducting which filters out contaminants therefrom and discharging the filtered air to the atmosphere.

2. The oil mist collection system according to claim 1 wherein each mist collector includes a spiral coil wall having a succession of inwardly extending turns within a housing chamber defining a spiral flow path into which is directed a tangential flow of air containing dispersed oil droplets to cause flow thereof inwardly through said spiral path causing oil droplets to condense on said spiral coil wall, said spiral coil wall extending about a vertical axis;

said collection tank located beneath said spiral coil wall and receiving collected oil draining from said spiral coil wall, said collection chamber drain connection connected to said machine tool coolant return.

3. The oil mist collection system according to claim 2 wherein each oil mist collector includes said air return ducting includes a return duct at each mist collector extending up from a respective collection chamber and through a central opening within said spiral coil wall along said vertical axis thereof to a point above an associated oil mist collector.

4. The oil mist collection system according to claim 3 wherein each oil mist collector includes a mist inlet chamber adjacent and connected to one side of said spiral coil housing chamber and connected to said chamber directing said flow of mist containing dispersed oil droplets into said spiral coil flow path substantially all along the vertical height of said spiral coil.

5. The oil mist collection system according to claim 1 wherein a respective drain valve receives collect oil and solid debris from each collection chamber, said drain valve isolating said air return ducting from said drain connection to prevent air from being drawn into said air return from said drain connection.

6. The oil mist collection system according to claim 5 wherein each drain valve comprises a flattened flexible tube having an unflattened upper end receiving condensed oil and any solid particles so as to periodically partially unflatten said tube by the weight of accumulated condensed oil and solid particles to allow discharge of a portion of said oil into said drain connection with immediate reflattening by exposure to vacuum created by said air filtration apparatus before allowing air to be drawn through said drain valve.

7. The oil mist collection system according to claim 5 wherein each drain valve comprises a flapper valve biased to close off a drain passage, with collected oil and any solid particles able to accumulate on said flapper valve to periodically overcome said bias and discharge accumulated collected oil and solid particles through said drain connection and said flapper valve thereafter reseated by said bias force prior to becoming open to the atmosphere to prevent air from entering said drain valve.

8. The oil mist collection system according to claim 4 wherein each oil mist collector further includes a spray header in said air inlet chamber on a side opposite said spiral coil chamber and directing a clean coolant spray onto said spiral coil wall to wash solid particles off said spiral coil wall and into said collection chamber.

9. The oil mist collection system according to claim 1 wherein said return ducting comprises a U-shaped trough having a flat top wall with an opening for connecting a return air duct from each oil mist collector.

10. The air mist collection system according to claim 1 wherein said drain collection includes a drain fitting having an opening recessed into the bottom of said chamber in an outer region and facing tangentially to collect oil and any solid debris.

11. A method of collecting a mist of dispersed oil droplets from the air around a plurality of machine tool stations, each of which includes a cutting fluid supply system directing coolant at one or more cutting tools and parts being machined and collecting and returning said coolant to a filtration apparatus comprising locating an oil mist collector at each machine tool station and collecting oil mist at said station, returning collected oil from each oil mist collector to a respective machine tool coolant return via a drain valve normally closed but opened periodically by the weight of accumulated collected oil and solid debris just sufficiently to discharge a portion of said collected oil and reclosed prior to the entry of any air inflow, and directing air after removal of oil mist to a central air filtration apparatus prior to being discharged to the atmosphere.

12. The method according to claim 10 wherein oil mist collecting at each machine tool station is carried out by directing air containing oil droplets into and through a spiral flow path defined by a vertical spiral coil wall to condense oil in a mist onto said spiral coil wall and draining said collected oil into a collection chamber just below said spiral coil wall, and returning oil from said collection tank to an associated machine tool coolant return.

13. The method according to claim 10 wherein air from which oil mist has been collected is returned by being directed through an air return duct extending from said collection chamber up through said spiral coil wall along the axis of an opening into said collection tank receiving collected oil draining from said spiral coil wall.

14. The method according to claim 10 wherein said collected oil from each oil mist collector is controllably drained from said drain chamber through a flattened flexible hose normally held closed by the application of a vacuum in said collection chamber from said air filtration apparatus via said air return duct and opened only periodically upon accumulation of a quantity of collected oil and debris above said flattened hose of a sufficient weight to open said flattened hose to discharge at least a portion thereof and reclose prior to the entrance of any air.

15. The method according to claim 11 wherein air containing an oil mist is directed into an outlet chamber adjacent said spiral coil wall and extending vertically the full height of said spiral coil wall to cause air flow into the entire vertical extent of said spiral flow passage.

16. The method according to claim 11 wherein a cyclonic air flow is induced in said collector chamber to force collected oil out to the perimeter of said chamber and collect said oil in a drain fitting facing tangentially in the outer perimeter of said collection chamber.

* * * * *